Patented Feb. 22, 1944

2,342,248

UNITED STATES PATENT OFFICE 2,342,248

CATALYTIC ISOMERIZATION OF OLEFINS

Robert E. Burk, Cleveland Heights, Ohio, assignor to The Standard Oil Company, Cleveland, Ohio, a corporation of Ohio No Drawing. Application December 21, 1940, Serial No. 371,135

16 Claims. (Cl. 260—683.2)

In the patent application of R. E. Burk et al. Ser. No. 297,414, there is set forth the aromatization of hydrocarbons by catalytic reaction involving certain defined catalyst compositions and operating conditions. I have now found that such compositions if subjected to certain quite different conditions as pointed out hereinafter, can change hydrocarbons to isomers instead of aromatics, and with outstanding efficiency.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

As hydrocarbons to be isomerized, any convenient source of olefins may be employed. Thus, pure olefins or mixtures may be used, or cracked stocks containing olefins, and in particular stocks prepared by cracking at low pressures and high recycle ratios. The olefin is subjected to the action of a catalyst, as for instance conveniently by passing in contact with the catalyst. The catalyst composition is as set forth in the abovementioned Burk et al. application, or as in detail in the Burk et al. patent application Ser. No. 262,492. That is, the catalyst is a co-precipitated gel mixture of chromium oxide, and aluminum oxide, and the latter may in some instances be replaced wholly or in part by thorium oxide or other dehydrating oxide, as titanium or silicon oxides. The chromic oxide is in amount of 18–30 mol per cent, and preferably about 20 mol per cent, and the aluminum oxide or the like 82–70 mol per cent, and preferably about 80 mol per cent. In some instances it is desirable to include a small amount of copper oxide with the other oxides, as set forth in Burk et al. patent application Ser. No. 263,198, and thus the copper oxide may be 2–10 mol per cent, the chromium oxide and larger proportion of aluminum oxide or other oxide making up the remainder.

The pressure is preferably maintained at around atmospheric pressure; and the temperature 700–900° F., and particularly 750–800° F. Desirably, the olefin or olefin mixture is subjected to the catalytic contact at a temperature of about 750–800° F. The flow rate may be 0.1–10 volumes of olefin or olefin mixture per volume of catalyst per hour. In some instances it is desirable to operate in the presence of hydrogen, and this may be supplied to pressures of 50–100 pounds per square inch. The hydrogen has a tendency to hydrogenate the olefins but under the present conditions such reaction is not complete and by operating at a high throughput isomerization can take charge particularly, and the operation improves the lead susceptibility of gasolines.

As an example: Hexene-1 is subjected to the action of a 20:80 Al:Cr gel type co-precipitated catalyst at a flow rate of 2.0 v. v. h., or to contact at a temperature of about 750° F. with flow rate 2.26 v. v. h., pressure being maintained at about atmospheric. A motor fuel yield of over 95 per cent is obtained, the $n_D$ of the final product being 1.398, as against 1.392 for the original olefin. The product tested by the well-known A. S. T. M. method of determining the blending octane number by using 25 per cent in a 50 octane number reference fuel showed a blending octane number of 106.4, as against 78 for the hydrocarbon material before the isomerization.

Other modes of applying the principle of the invention may be employed, change being made as regards the details described, provided the features stated in any of the following claims, or the equivalent of such, be employed.

I therefore particularly point out and distinctly claim as my invention:

1. A process of the character described, which comprises changing an olefin to an isomer by contacting with a mass consisting of a co-precipitated gel mixture of 20:80 mol per cent of chromium and aluminum oxides, at a temperature below that for aromatizing and in a range of about 750–800° F., substantially without hydrogen split-off while maintaining the pressure about atmospheric.

2. A process of the character described, which comprises changing an olefin to an isomer by contacting with a mass consisting of a co-precipitated gel mixture of 20:80 mol per cent of chromium and aluminum oxides, at a temperature below that for aromatizing and not substantially below 700° F., substantially without hydrogen split-off while maintaining the pressure about atmospheric.

3. A process of the character described, which comprises changing an olefin to an isomer by contacting with a mass consisting of a co-precipitated gel mixture of the composition limits not less than 18 or more than 30 mol per cent of chromium oxide and not more than 82 or less than 70 mol per cent of aluminum oxide, at a temperature below that for aromatizing and in a range of about 750–800° F., substantially without hydrogen split-off while maintaining the pressure about atmospheric.

4. A process of the character described, which comprises changing an olefin to an isomer by contacting with a mass consisting of a co-precipitated gel mixture of the composition limits not less than 18 or more than 30 mol per cent of chromium oxide and not more than 82 or less than 70 mol per cent of aluminum oxide, at a temperature below that for aromatizing and not substantially below 700° F., substantially without hydrogen split-off while maintaining the pressure about atmospheric.

5. A process of the character described, which comprises changing an olefin to an isomer by contacting in the presence of supplied hydrogen with a mass consisting of a co-precipitated gel mixture of 20:80 mol per cent of chromium and aluminum oxides, at a temperature below that for aromatizing and in a range of about 750–800° F.

6. A process of the character described, which comprises changing an olefin to an isomer by contacting in the presence of supplied hydrogen with a mass consisting of a co-precipitated gel mixture of 20:80 mol per cent of chromium and aluminum oxides, at a temperature below that for aromatizing and not substantially below 700° F.

7. A process of the character described, which comprises changing an olefin to an isomer by contacting in the presence of supplied hydrogen with a mass consisting of a co-precipitated gel mixture of the composition limits not less than 18 or more than 30 mol per cent of chromium oxide and not more than 82 or less than 70 mol per cent of aluminum oxide, at a temperature below that for aromatizing and in a range of about 750–800° F.

8. A process of the character described, which comprises changing an olefin to an isomer by contacting in the presence of supplied hydrogen with a mass consisting of a co-precipitated gel mixture of the composition limits not less than 18 or more than 30 mol per cent of chromium oxide and not more than 82 or less than 70 mol per cent of aluminum oxide, at a temperature below that for aromatizing and not substantially below 700° F.

9. A process of the character described, which comprises changing an olefin to an isomer by contacting with a mass consisting of a mixture of 2–10 mol per cent copper oxide, a larger per cent of chromium oxide but not over 30 mol per cent and not over around 80 mol per cent of an oxide from the group consisting of aluminum, silicon, titanium and thorium, at a temperature below that for aromatizing and in a range of about 750–800° F., substantially without hydrogen split-off while maintaining the pressure about atmospheric.

10. A process of the character described, which comprises changing an olefin to an isomer by contacting in the presence of supplied hydrogen with a mass consisting of a co-precipitated gel mixture of 20:80 mol per cent of chromium oxide and an oxide from the group consisting of aluminum, silicon, titanium and thorium, at a temperature below that for aromatizing and not substantially below 700° F., substantially without hydrogen split-off while maintaining the pressure about atmospheric.

11. A process of the character described, which comprises changing an olefin to an isomer by contacting in the presence of supplied hydrogen with a mass consisting of a co-precipitated gel mixture of the composition limits not less than 18 or more than 30 mol per cent of chromium oxide and not more than 82 or less than 70 mol per cent of an oxide from the group consisting of aluminum, silicon, titanium and thorium, at a temperature below that for aromatizing and not substantially below 700° F., substantially without hydrogen split-off while maintaining the pressure about atmospheric.

12. A process of the character described, which comprises changing an olefin to an isomer by contacting in the presence of supplied hydrogen with a mass consisting of 2–10 mol per cent of oxide of copper, a larger per cent of chromium oxide but not over 30 mol per cent and not over around 80 mol per cent of an oxide from the group consisting of aluminum, silicon, titanium and thorium, at a temperature below that for aromatizing and not substantially below 700° F.

13. A process of the character described, which comprises changing an olefin to an isomer by contacting with a mass consisting of a co-precipitated gel mixture of 20:80 mol per cent of chromium oxide and an oxide from the group consisting of aluminum, silicon, titanium and thorium, at a temperature below that for aromatizing and in a range of about 750–800° F., substantially without hydrogen split-off while maintaining the pressure about atmospheric.

14. A process of the character described, which comprises changing an olefin to an isomer by contacting with a mass consisting of a co-precipitated gel mixture of the composition limits not less than 18 or more than 30 mol per cent of chromium oxide and not more than 82 or less than 70 mol per cent of an oxide from the group consisting of aluminum, silicon, titanium and thorium, at a temperature below that for aromatizing and in a range of about 750–800° F., substantially without hydrogen split-off while maintaining the pressure about atmospheric.

15. A process of the character described, which comprises changing an olefin to an isomer by contacting with a mass consisting of a co-precipitated gel mixture of 20:80 mol per cent of chromium oxide and an oxide from the group consisting of aluminum, silicon, titanium and thorium, at a temperature below that for aromatizing and not substantially below 700° F., substantially without hydrogen split-off while maintaining the pressure about atmospheric.

16. A process of the character described, which comprises changing an olefin to an isomer by contacting with a mass consisting of a co-precipitated gel mixture of the composition limits not less than 18 or more than 30 mol per cent of chromium oxide and not less than 70 mol per cent of an oxide from the group consisting of aluminum, silicon, titanium and thorium, at a temperature below that for aromatizing and not substantially below 700° F., substantially without hydrogen split-off while maintaining the pressure about atmospheric.

ROBERT E. BURK.